United States Patent
Dale (10) Patent No.: US 8,429,057 B1
(45) Date of Patent: Apr. 23, 2013

(54) SYSTEMS AND METHODS FOR CREATION, ISSUANCE, REDEMPTION, CONVERSION, OFFERING, TRADING, AND CLEARING A DEBT OBLIGATION CONVERTIBLE INTO CASH PLUS A SPOT FOREIGN EXCHANGE CONTRACT THAT IS PRICED TO REFLECT THE VALUE OF THE DEBT OBLIGATION IN A BASE CURRENCY IN RELATION TO THE VALUE OF A REFERENCE CURRENCY

(75) Inventor: William J P Dale, New York, NY (US)

(73) Assignee: Curex Innovations LLC, New York, NY (US)

( * ) Notice: Subject to any disclaimer, the term of this patent is extended or adjusted under 35 U.S.C. 154(b) by 437 days.

(21) Appl. No.: 12/274,319

(22) Filed: Nov. 19, 2008

Related U.S. Application Data (60) Provisional application No. 60/989,023, filed on Nov. 19, 2007, provisional application No. 61/013,524, filed on Dec. 13, 2007.

(51) Int. Cl.
*G06Q 40/00* (2006.01)

(52) U.S. Cl.
USPC .............................. 705/37; 705/36 R; 705/38

(58) Field of Classification Search ...................... 705/37
See application file for complete search history.

(56) References Cited

U.S. PATENT DOCUMENTS

| 7,020,626 | B1 | 3/2006 | Eng et al. ........................ 705/27 |
| 7,167,837 | B1 | 1/2007 | Ciampi et al. .................. 705/35 |
| 7,171,386 | B1 | 1/2007 | Raykhman ..................... 705/37 |
| 7,363,269 | B2 | 4/2008 | Horsfall et al. ................. 705/37 |
| 7,366,690 | B1 | 4/2008 | Howorka et al. ............... 705/35 |
| 7,433,837 | B2 | 10/2008 | Dawson |
| 7,574,394 | B2 | 8/2009 | Chorna et al. .................. 705/36 |
| 7,636,682 | B1 | 12/2009 | MacPherson |
| 7,680,722 | B2 | 3/2010 | Bok et al. |
| 7,711,632 | B2 * | 5/2010 | Chorna et al. .................. 705/37 |
| 7,840,483 | B2 | 11/2010 | Youngren et al. .............. 705/37 |
| 7,937,316 | B2 | 5/2011 | Friedman et al. .............. 705/37 |
| 2002/0198823 | A1 | 12/2002 | Laederich et al. |
| 2003/0225648 | A1 | 12/2003 | Hylton ........................... 705/35 |
| 2004/0143536 | A1 * | 7/2004 | Haberle ......................... 705/37 |
| 2004/0186806 | A1 | 9/2004 | Sinclair et al. |

(Continued)

OTHER PUBLICATIONS

Snajoy Banka, Foreign Currency Convertible Bonds, Nov. 2005, The Chartered Accountant.*

(Continued)

*Primary Examiner* — Lindsay M Maguire
*Assistant Examiner* — Cho Kwong
(74) *Attorney, Agent, or Firm* — Proskauer Rose LLP

(57) ABSTRACT

Securities trading systems and methods for creating, issuing, offering, trading, redeeming, converting, and clearing a novel debt obligation convertible into cash plus a foreign exchange spot or forward contract that is priced to reflect the value of the debt obligation in a base currency in relation to the value of a reference currency. In the system, an order book server aggregates bid and offer information for the debt obligations. Best bid and offer information is communicated to one or more trading terminals. The trading terminals are capable of displaying best bid and offer and other information relevant to trading, redeeming, and converting the debt obligations in real time and allow a trader to trade, redeem, and convert C-Notes™ by interacting with the display on the trading terminal. The order book server and issuer calculate and track accrued interest on the debt obligations.

21 Claims, 5 Drawing Sheets

U.S. PATENT DOCUMENTS

| | | | |
|---|---|---|---|
| 2004/0199442 A1 | 10/2004 | Haberle | 705/37 |
| 2004/0254804 A1 | 12/2004 | Peterffy et al. | |
| 2005/0171894 A1 | 8/2005 | Traynor | 705/37 |
| 2005/0216407 A1 | 9/2005 | Feldman et al. | 705/42 |
| 2006/0080192 A1 | 4/2006 | McCabe | 705/35 |
| 2006/0095361 A1 | 5/2006 | Rude | |
| 2006/0111999 A1* | 5/2006 | Spirgel et al. | 705/35 |
| 2006/0218075 A1* | 9/2006 | Feldman et al. | 705/37 |
| 2007/0239584 A1 | 10/2007 | Fross et al. | |
| 2008/0040256 A1 | 2/2008 | Neyman et al. | |
| 2009/0063366 A1 | 3/2009 | Friedman et al. | 705/36 |
| 2009/0089223 A1 | 4/2009 | Dawson | |
| 2009/0281911 A1 | 11/2009 | Sinclair et al. | |
| 2010/0023457 A1 | 1/2010 | Riviere et al. | |
| 2010/0076906 A1 | 3/2010 | Eubank et al. | |
| 2010/0174664 A1 | 7/2010 | Kelly et al. | 705/36 |
| 2010/0332380 A1 | 12/2010 | Kemp, II et al. | |
| 2011/0137785 A1 | 6/2011 | Lutnick et al. | |

OTHER PUBLICATIONS

Heather Bell, Deutsche Lists U.K's Money Market ETT's, Apr. 21, 2008 (http://www.indexuniverse.com/sections/news/4003-deutsche-bank-lists-uks-tirst-money-market-etfs.html).

David Fry, "Rydex Investments Euro Currency Trust: Retail Investors "Euro-Serewed"? (ETF: FXE)", Nov. 3, 2005 (http://seekingalpha.com/article/3968-rydex-investments-euro-currency-trsut-retail-investors-euro-serewed-etf-fxe).

"A Guide to Currency ETFs and ETNs" Feb. 28, 2010 (http://seekingalpha.com/article/31129-a-guide-to-currency-etfs-and-ctns).

"iPath's New Currency ETNs vs. CurrencyShares ETF's: Room For Both?" May 10, 2007 (http://seekingalpha.com/article/35128-ipaths-new-currency-etns-vs-currencyshares-etfs-room-for-both).

Ray Hendon, "The Birth of a Barclays Currency ETN" Sep. 11, 2008)( http://seekingalpha.com/article/94956-the-birth-of-a-barclays-currency-etn).

"Wisdom Tree Drcyfins Currency Income ETFs" (http://www.wisdometree.com/etfs/index-currency.asp).

"Wisdom Tree FAQs" (http://www.wisdometree.com/about/faq-curr.asp).

"Move Over CurrencyShares: PowerShares Launches Two Currency ETFs" Feb. 20, 2007.

WM/Reuters, "Spot & Forward Rates Methodology Guide," (C)2010 The WM Company, http://www.wmcompany.com/pdfs/WMReutersMethodology.pdf, retrieved Sep. 5, 2012, 13 pages.

WM/Reuters, "Forward Rate Currencies and Time Periods," (C)2010 The WM Company, http://www.wmcompany.com/pdfs/ForwardCurrencyTimePeriods%20.pdf, retrieved Sep. 5, 2012, 3 pages.

WM/Reuters, "Inverted and Non-Inverted Currencies," (C)2010 The WM Company, http://www.wmcompany.com/pdfs/InvertedandNonInvertedCurrencies%20.pdf, retrieved Sep. 5, 2012, 2 pages.

WM/Reuters, "Spot Cross Calculations," (C)2010 The WM Company, http://www.wmcompany.com/pdfs/WMReutersCrossCalculations%20.pdf, retrieved Sep. 5, 2012, 2 pages.

WM/Reuters, "Forwards Cross Calculation (to a non-inverted currency)," (C)2010 The WM Company, http://www.wmcompany.com/pdfs/WMReutersForwardCrossCalculations%20.pdf, retrieved Sep. 5, 2012, 1 page.

WM/Reuters, "Spot Rates—Start &End Dates," (C)2010 The WM Company, http://www.wmcompany.com/pdfs/WMReutersSpotandForwardstartdates.pdf, retrieved Sep. 5, 2012, 3 pages.

WM/Reuters, "Closing Spot Rates," (C)2010 The WM Company, http://www.wmcompany.com/pdfs/Thomson-ReutersAllSpotForwardRatesConfiguration.pdf, retrieved Sep. 5, 2012, 4 pages.

WM/Reuters, "Accessing the WM/Reuters Rates via Bloomberg," (C)2010 The WM Company, http://www.wmcompany.com/pdfs/AccessingWMReutersRatesviaBloomberg%20.pdf, retrieved Sep. 5, 2012, 3 pages.

WM/Reuters, "Forward Rate NDF Currencies & Time Periods," (C)2010 The WM Company, http://www.wmcompany.com/pdfs/NDFForwardCurrencyTimePeriods.pdf, retrieved Sep. 5, 2012, 1 page.

WM/Reuters, "The WM/Reuters Closing NDF Rates," (C)2010 The WM Company, http://www.wmcompany.com/pdfs/Thomson-ReutersAllNDFRatesConfiguration.pdf, retrieved Sep. 5, 2012, 2 pages.

WM/Reuters, "History, 2010 The WM Company," (C)2010 The WM Company, http://www.wmcompany.com/wmr/Publications/WMReutersDocumentation/index.htm, retrieved Sep. 5, 2012, 3 pages.

* cited by examiner

Using trading terminal 20, Trader 10 enters an order to convert 100 EUR C-Note™ to an FX spot transaction at any time after initial purchase on a primary or secondary market (e.g. 6 months)
510

Trading terminal 20 communicates conversion instruction in real time to order book server 30.
520

Order book server 30 communicates the conversion instruction in real time to C-Note™ issuer server
530

C-Note™ issuer server effects conversion of C-Note™ debt obligation by executing an FX spot contract (of FX forward contract)
531

Confirmation of conversion of the FX component of the C-Note™ debt obligation is issued to the order book server
533

100 EUR (+/- accrued interest for, e.g., 6-month period) wired (or portion thereof if originally bought on margin) from trader 10's trading account via instruction entered into trading terminal 20 and communicated to order server 30 to FX prime broker to secure 100 EUR USD spot contract for trader 10
540

C-Note™ issuer server effects conversion of cash component of the C-Note™ debt obligation
541

Confirmation of conversion of the cash component of C-Note™ debt obligation is issued to the order book server
543

FIG. 5

SYSTEMS AND METHODS FOR CREATION, ISSUANCE, REDEMPTION, CONVERSION, OFFERING, TRADING, AND CLEARING A DEBT OBLIGATION CONVERTIBLE INTO CASH PLUS A SPOT FOREIGN EXCHANGE CONTRACT THAT IS PRICED TO REFLECT THE VALUE OF THE DEBT OBLIGATION IN A BASE CURRENCY IN RELATION TO THE VALUE OF A REFERENCE CURRENCY

RELATED APPLICATIONS

This application claims the benefit of U.S. Provisional Application No. 60/989,023, filed on Nov. 19, 2007 and U.S. Provisional Application No. 61/013,524, filed on Dec. 13, 2007, the entire contents of which are incorporated herein by reference.

FIELD OF THE INVENTION

The present invention relates to computer-implemented methods and systems for offering and trading securities. More specifically, embodiments of the present invention relate to computer-based systems and methods for creating, issuing, offering, trading, redeeming, converting, and clearing a novel debt obligation convertible into cash plus a foreign exchange (FX) spot or forward contract that is priced to reflect the value of the debt obligation in a base currency in relation to the value of a reference currency.

BACKGROUND OF THE INVENTION

The currency market represents one of the world's largest financial markets. One reason investors purchase foreign currencies is to manage foreign exchange risk exposure. For example, United States residents going to visit a European country on vacation have the risk that if that if the Euro (EUR) appreciates against the United States Dollar (USD), their vacation will be more expensive. Exporters who sell products in foreign currency have the risk that if the value of that foreign currency falls, then the revenues in the exporter's home currency will be lower. An importer who buys goods priced in foreign currency has the risk that the foreign currency will appreciate and make the local currency cost greater than expected.

Fund managers and companies who own foreign assets are also regularly exposed to changes in currency exchange rates. For example, a mutual fund manager who purchases foreign securities in a foreign currency for a mutual fund that is traded in a home currency must take into account fluctuations in currency exchange rates in managing the assets of the mutual fund. A large number of investors also invest in foreign currencies for speculative purposes, i.e., to profit from accurately predicting changes in currency rates.

In every foreign exchange transaction, one currency is purchased and another currency is sold. The currencies that are purchased and sold in a foreign exchange transaction are also referred to as a currency pair. A currency pair consists of a base currency and a reference currency. EUR/USD is an example of a currency pair. In this example, the base currency is EUR and its value remains constant at one EUR. The reference currency is USD. The value of the reference currency fluctuates up and down relative to the base currency. For example, if the EUR/USD currency pair is quoted at 1.1500, it means that one EUR costs USD 1.1500. Likewise, if the EUR/USD currency pair increases to 1.2000, the same EUR is now equivalent to USD 1.2000.

Currency transactions can be quoted in one of two ways: American-terms, in which a currency is quoted in terms of the number of United States Dollar per unit of foreign currency (e.g., how many USD to buy 1 EUR), and in European-terms, in which one United States Dollar is quoted in terms of number of units of foreign currency per dollar (e.g., how many Euro to buy 1 USD). The same logic can be applied to currency pairs in which the USD is not one of the currencies. Either currency can be expressed in terms of the other. However there are generally accepted conventions in the interbank foreign exchange marketplace that have been adopted by most of the foreign exchange marketplace. For example, the EUR/USD pair is quoted in American Terms and the Swiss Franc is quoted in European Terms.

In currency trading, a long position refers to entering into a contract to buy a base currency in exchange for a set amount of reference currency at a set time in the future. A trader may speculate that the price of a base currency will increase relative to the value of the reference currency by entering into a long position. A short position in currency trading means that the trader has entered into a contract to sell a set amount of base currency in exchange for a set amount of reference currency. A trader may speculate that the price of a base currency will decrease relative to the value of the reference currency by entering into a short position.

Foreign exchange (FX) transactions are offered as FX spot transactions or FX forward transactions. FX spot transactions are exchanges of one currency for another for immediate delivery. FX spot transactions are conducted at an exchange rate for immediate delivery known as the spot rate. Immediate delivery in the spot market is generally two business days, which is called the value date. The two day settlement period is necessary to allow for trade processing and for currency payments to be wired around the world.

FX forward transactions are exchanges of one currency for another at a future date. FX forward transactions are conducted at a forward rate, which is the exchange rate available at the time of the purchase of the FX forward transaction for exchanging currency at some specified date in the future. The forward rate is a function of both the spot rate and the difference in interest rates that could be earned in money markets or bond markets in the respective two countries. The difference between a forward exchange rate and a spot exchange rate represents the benefit or disadvantage an investor would experience should they convert in the spot market from one currency represented in the pair to the other and hold the new currency earning interest at a risk free rate. To the extent that there is an economic advantage associated with a higher interest rate in the new currency, such advantage is reflected in the price of the FX forward transaction. The discount or premium to the spot price in an FX forward transaction of the same pair is typically referred to as the "carry" or "cost of carry."

The foreign exchange market operates five days per week on a 24-hour trade date basis beginning at 5 p.m. Eastern Standard Time (EST) Sunday. A trading day begins at 5 p.m. EST and ending the next day at 5 p.m. EST. For example, on a Monday, spot currencies are trading for value on Wednesday (assuming no holidays). At 5 p.m. EST on Monday, the trade date becomes Tuesday and the value date becomes Thursday. A position opened on Monday at 5 p.m. EST is either closed or rolled over to the next value date before the end of trading day on Tuesday. In this example, a one-day rollover involves the open position being rolled over from a value date of Wednesday to that of Thursday.

Rollover transactions are effectuated by making two offsetting trades that result in the same open position. However, when making rollover transactions, the rate at which a currency pair is quoted can change. These changes represent the difference in interest rates between the two currencies in the trader's open position applied in currency-rate terms (i.e., one day of "carry" or "cost of carry"). They constitute net interest earned or paid by the trader, depending on the direction of the trader's position. Assuming there is no change in the spot exchange rate for the currency pair, a trader can earn money in a rollover transaction if the trader holds a long position in the currency with the higher interest rate and holds a short position in the currency with the lower interest rate. Conversely, a trader can lose money in a rollover transaction if the trader holds a short position in the currency with the higher interest rate and holds a long position in the currency with the lower interest rate.

Exchange traded funds (ETFs) offer public investors an undivided interest in a pool of securities or other assets and thus are similar in many ways to traditional mutual funds, except that shares in an ETF can be bought and sold throughout the day like stocks on a securities exchange through a broker-dealer. Unlike traditional mutual funds, traders and investors participating in a secondary market can buy and sell ETFs without having to redeem their individual shares at net asset value, or NAV. Instead, financial institutions or other qualified investors purchase and redeem ETF shares directly from the ETF in the primary market, but only in large blocks. In the case of currency ETFs, financial institutions or other qualified investors convert currency holdings to shares that trade in a publicly tradeable marketplace. It is recognized these have been developed and are substantially different from embodiments the present invention.

In 2005, Rydex Investments launched the first ever currency ETF called the Euro Currency Trust (NYSE: FXE) in New York. Since then Rydex has launched a series of funds tracking all major currencies under their brand Currency-Shares. In 2008, Deutsche Bank's db x-trackers launched Sterling Money Market ETF (LSE: XGBP) and US Dollar Money Market ETF (LSE: XUSD) in London.

Currency ETFs do not require rollover transactions to maintain currency positions, but they have disadvantages inherent in their structure. Currency ETF shares are priced to the foreign exchange rate plus interest, which creates tracking error from the currency price being traded. They also do not trade on the 24 hour per day trading cycle of the foreign exchange markets and are therefore more difficult to redeem. They also are quoted in a convention not consistent with the interbank market and with settlement periods not consistent with the foreign exchange interbank market. For this reason, they may have a value that may track the value of currency but cannot be considered fungible with spot FX contracts or forward contracts. Their lack of fungibility means they suffer from far less volume, less institutional participation in trading and price discovery and have greater risk of price tracking error. Inherently, Currency ETFs are not an efficient vehicle to trade currencies or baskets of currencies as a security.

Currency ETFs also have disadvantages in the way that interest is paid. With currency ETFs, interest is earned in a reference currency and then converted into the base currency at some unknown rate close in time to the date on which dividends are paid (typically monthly) and then distributed to shareholders, which exposes currency ETF investors to additional foreign currency exposure on accrued interest.

There are also currency Exchange Traded Notes (ETNs) that have been developed. ETNs are debt securities backed by an issuer that are designed to provide investors access to returns of various benchmarks. Though linked to the performance of a market benchmark, ETNs are not equities or index funds, but they do share several characteristics of the latter. Similar to equities, they are traded on an exchange and can be shorted. Similar to index fund, they are linked to the return of a benchmark index. But as debt securities, ETNs do not actually own anything they are tracking.

There are currency ETNs that have been developed to attempt to provide investors with returns of certain currency benchmarks. But currency ETNs are subject to risk of default by the issuing bank as counter party. Currency ETNs also share many of the same disadvantages of currency ETFs, inclduing that currency ETNs have disadvantages in the way that interest is paid and the way it is included in the price of the instrument making it more difficult for the trader to determine the accuracy of the instruments' tracking of the value of underlying assets, they are more difficult to redeem (they can be redeemed only in the primary market), and are not fungible with FX spot and forward transactions. This is due to the fact that an ETN is redeemable in the primary market for an amount equal to an index—making the ETN very accurate at tracking the index but this index may temporarily diverge in value from the underlying asset it seeks to track thus marking it more difficult to arbitrage price to the actual underlying asset. To effect such a price arbitrage, the trader would have to add an extra step of arbitraging the price of the index to the underlying assets it seeks to track thus adding complexity and cost to the process.

The global FX marketplace is estimated to transact over four trillion USD per day. Much of that volume is concentrated on a few pairs such as the EUR, USD and Japanese Yen. Rather than one centralized regulated marketplace, the global FX market consists of many fragmented, unregulated, over-the-counter pools of liquidity which can range from a single counterparty-to-counterparty market to a pool of liquidity providers competing for order flow from liquidity takers in an electronic order matching electronic network. The nature of the fragmentation of the global FX marketplace means it is possible that a single currency pair can trade at different prices, in different markets at the same time. It is desirable for the purpose of price transparency, liquidity and market confidence to provide methods and systems to attract traders for purpose of transparent price discovery and to add liquidity to the global FX marketplace, especially in currency pairs that do not enjoy the liquidity that exists in major currency pairs such as that of the US Dollar, Euro and Japanese Yen.

Accordingly, it is desirable to provide methods and systems for maintaining currency exposure that enable investors to maintain currency exposure without having to effectuate rollover transactions, which trade on the 24 hour per day trading cycle of the foreign exchange markets, are structured and traded so that they more closely priced to track spot transactions in a given currency pair, and are easier to redeem in a manner consistent with the inter-bank convention such that FX traders or investors may consider their value to be fungible for a spot FX contract. Such fungibility for a spot FX contract would attract greater institutional participation, greater volume for more effective price discovery and bring more transparency to global foreign exchange markets through the natural profit motive of price discovery arbitrage benefiting participants in both primary and secondary securities markets as well as governments who issue such currency and wish to have orderly, liquid markets in their base currency unit.

SUMMARY OF THE INVENTION

Embodiments of the present invention are directed to overcoming the disadvantages of traditional rollover foreign exchange transactions and currency ETFs by providing computer-based systems and methods for creating, issuing, offering, trading, and redeeming, converting, and clearing a debt obligation convertible into cash plus a spot foreign exchange contract (or a forward foreign exchange contract) that is priced to reflect the value of the debt obligation in a base currency in relation to the value of a reference currency. Applicant's affiliated entities refer to a preferred embodiment of such convertible debt obligations by the trade name C-Notes™.

C-Notes™ are variable return convertible debt securities that are preferably issued by one or more money-center banks, central banks or sovereign debt issuers of investment grade, and are structured to track the price of a base currency in terms of a reference currency and deliver returns of its base currency's corresponding overnight money market interest rate relative to the reference currency's corresponding overnight money market interest rate (i.e., carry). C-Notes™ can also be structured to track the price of a group of base currencies in terms of a group of reference currencies and deliver returns of their base currencies' corresponding overnight money market interest rate relative to the reference currencies' corresponding overnight money market interest rate The systems and methods by which the resultant difference between the spot currency pair foreign exchange price and a forward currency pair foreign exchange price in the reference currency (carry) can be added to a reference money market rate earned in the currency in which the C-Notes™ is quoted and traded to achieve a rate that may be similar to the yield that could otherwise be earned in the money markets of the base currency. Derivative securities or other derivatives of the C-Notes™ can be created and traded on public exchanges, over-the-counter (OTC) markets, and direct counterparty markets. The methods and systems described herein can also be used for the purpose of replicating valuation movements in equities or groups of equities, debt products or groups of debt products, commodities or groups of commodities or alternative assets or groups of alternative assets in the futures, spot or physical delivery markets which can include other costs of carry such as shipping costs or storage costs.

It is an object of the present invention to provide methods and systems for maintaining currency exposure that enable investors to maintain currency exposure without having to effectuate rollover transactions, which trade on the 24 hour per day trading cycle of the foreign exchange markets, are structured and traded so that they more closely priced to track spot transactions in a given currency pair, and are easier to redeem.

These and other objects are achieved in the present invention of methods and systems for offering, trading, and redeeming, converting, and clearing a debt obligation convertible into cash plus a spot foreign exchange contract (or a forward foreign exchange contract) that is priced to reflect the value of the debt obligation in a base currency in relation to the value of a reference currency.

In the system, an order book server aggregates bid and offer information for C-Notes™. Best bid and offer information is communicated to one or more trading terminals. The trading terminals are capable of displaying best bid and offer and other information relevant to trading, redeeming, and converting the C-Notes™. The trading terminals allow a trader to trade, redeem, and convert C-Notes™ by interacting with the display on the trading terminal. The server can segment and organize best bid/offer by price, size or other user defined metrics and distinguish between bid/offers relating to the issuance (creation) and conversion (redemption) of C-Notes™ in the primary market (e.g., issuer to qualified institutional investor) or in a secondary market where C-Notes™ are transacted between counterparties who either make liquidity or take liquidity with no creation or redemptions.

The order book server calculates accrued interest on the C-Notes™. Accrued interest for C-Notes™ that are denominated in USD can be calculated by adding the effective Fed Funds Overnight rate (or similar overnight money market or repo market rate) to the difference between the effective Overnight Rate central bank rate or repo market rate of the base currency and the effective Overnight Rate central bank rate or repo market rate of the reference currency.

C-Notes™ have a term and mature for a value at the end of the term equal to the face value plus or minus accrued interest. For example, a one year term 100 EUR/USD C-Notes™ priced at 150.0000 USD pays 100 EUR at maturity at the end of one year plus or minus accrued interest.

C-Notes™ can be traded in secondary markets. When traded before the end of the term, the trader who sells C-Notes™ on the secondary market receives cash plus or minus accrued interest for the period of the term in which the trader held the C-Notes™ since the last interest payment. At any time during the term, C-Notes™ also can be converted to spot or forward foreign exchange contracts in real time plus cash equal to face value or a portion thereof if acquired on margin or levered basis.

According to one embodiment, a computer-implemented method is provided for offering a debt obligation. The method can comprise the steps of (i) receiving communication at an order book server of an offer to sell the debt obligation, the debt obligation having a term that is priced in a base currency in relation to the value of reference currency, where the debt obligation is convertible into a foreign exchange contract with a currency pair of the base currency and the reference currency of the debt obligation; (ii) communicating the offer to sell the debt obligation to one or more trader terminals; (iii) receiving an offer to purchase the debt obligation from one of the one or more trader terminals; and (iv) calculating accrued interest on the debt obligation at the order book server at issuance and during the term of the debt obligation. The communication of the offer to sell that is received at the trading terminal can be made in response to a request to an issuer to offer a tranche of debt obligations having the term and that are priced in the base currency in relation to the value of the reference currency.

According to another embodiment, a computer-implemented method is provided for converting a debt obligation having an amount that is priced in a base currency in relation to the value of a reference currency, into a foreign exchange spot or forward transaction in the base currency and the reference currency of the debt obligation. The method can comprise the steps of (i) receiving on an order book server a communication of a request to convert the debt obligation from a trader terminal of a trader holding the debt obligation; (ii) electronically communicating the request to convert in real time to a foreign exchange prime broker; (iiii) calculating accrued interest on the debt obligation for the length of the term that the trader held the debt obligation; (iv) causing funds to be wired from the trader's account to the foreign exchange prime broker or other counterparty for the foreign exchange spot or forward transaction to secure a foreign exchange spot or forward contract, the funds calculated by the order book server as the amount of the debt obligation plus or minus accrued interest over the period that the trader held the debt obligation; (v) receiving confirmation at the order book server from a foreign exchange prime broker or other counterparty to the foreign exchange spot or forward contract that the request to convert has been executed; and (vi) communicating confirmation of the request to convert to the trader terminal.

In any of the aforementioned embodiments, the accrued interest can be calculated by adding one of an effective Fed Funds Overnight rate, overnight money market, or repo market rate for the base currency to the difference between the effective Overnight Rate, central bank rate, or repo market rate of the base currency and the effective Overnight Rate, central bank rate or repo market rate of the reference currency. The accrued interest can be calculated daily. The can be calculated in real time based on a current repo market rate allowing for intra-day interest calculation and interest payments paid daily or every two days according to an interbank settlement system. The accrued interest can be positive or negative.

According to another embodiment, a system is provided for trading a debt obligations having terms that are priced in a base currency in relation to the value of a reference currency, into cash equivalent to the base currency price and a foreign exchange spot or forward transaction in the base currency and the reference currency of the debt obligation. The system can comprise an order book server configured to communicate with one or more trading terminals; one or more issuer servers; and one or more foreign exchange prime brokers. The order book server can be programmed to (i) receive communications of offers to sell and buy the debt obligations from the one or more trader terminals or the one or more issuer servers; (ii) communicate the offers to sell and buy the debt obligations to one or more trader terminals; (iii) receive an offer to purchase the debt obligation from one of the one or more trader terminals; and (iv) calculate accrued interest on the debt obligation.

According to particular embodiments, the order book server can be programmed further to receive and execute requests to convert the debt obligation to a spot or forward foreign exchange transaction. The order book server can be programmed further to effect redemption of the debt obligation at the end of the term. The order book server can be programmed further to calculate the accrued interest daily. The order book server can be programmed further to calculate the accrued interest in real time based on a current repo market rate allowing for intra-day interest calculation and interest payments paid daily or every two days according to an interbank settlement system. The system can further comprise a centralized clearing body that communicates with the order book server to clear and settle transactions in the debt obligations. The centralized clearing body can include a centralized clearing corporation, a consortium of clearing corporations, a central bank, a consortium of central banks, a sovereign, a consortium of sovereigns, a sovereign sponsored corporation, a consortium of sovereign sponsored corporations, a supranational entity or a consortium of supranational entities. The centralized clearing body can comprise the order book server.

DETAILED DESCRIPTION

Preferably, C-Notes™ convertible debt obligations are issued in response to an order (bid) from (a) qualified institutional investor(s). Qualified institutional investors can include Accredited Investors as defined in Regulation D promulgated under the United States Securities Act of 1933 and/or Qualified Purchasers as defined in United States Securities Act of 1933. However, C-Notes™ can be issued to other types of investors as well.

Investors in C-Notes™ preferably have an account in good standing with an FX prime broker/broker or be able to conduct counterparty-to-counterparty transactions in the interbank foreign exchange marketplace. The institutional investor or their FX prime broker/broker can have active trading lines with an issuer of C-Notes™, be a financial institution who may act as a recognized counterparty to an issuer of C-Notes™ or the issuer's foreign exchange prime broker, or otherwise have an account in good standing with the C-Notes™ issuer or the issuer's foreign exchange prime broker. For purposes of engaging in secondary market transactions, it is preferred that qualified institutional investors have an account in good standing with a clearing broker dealer (or introductory broker dealer who facilitates an account with a clearing broker dealer).

Figure 1:
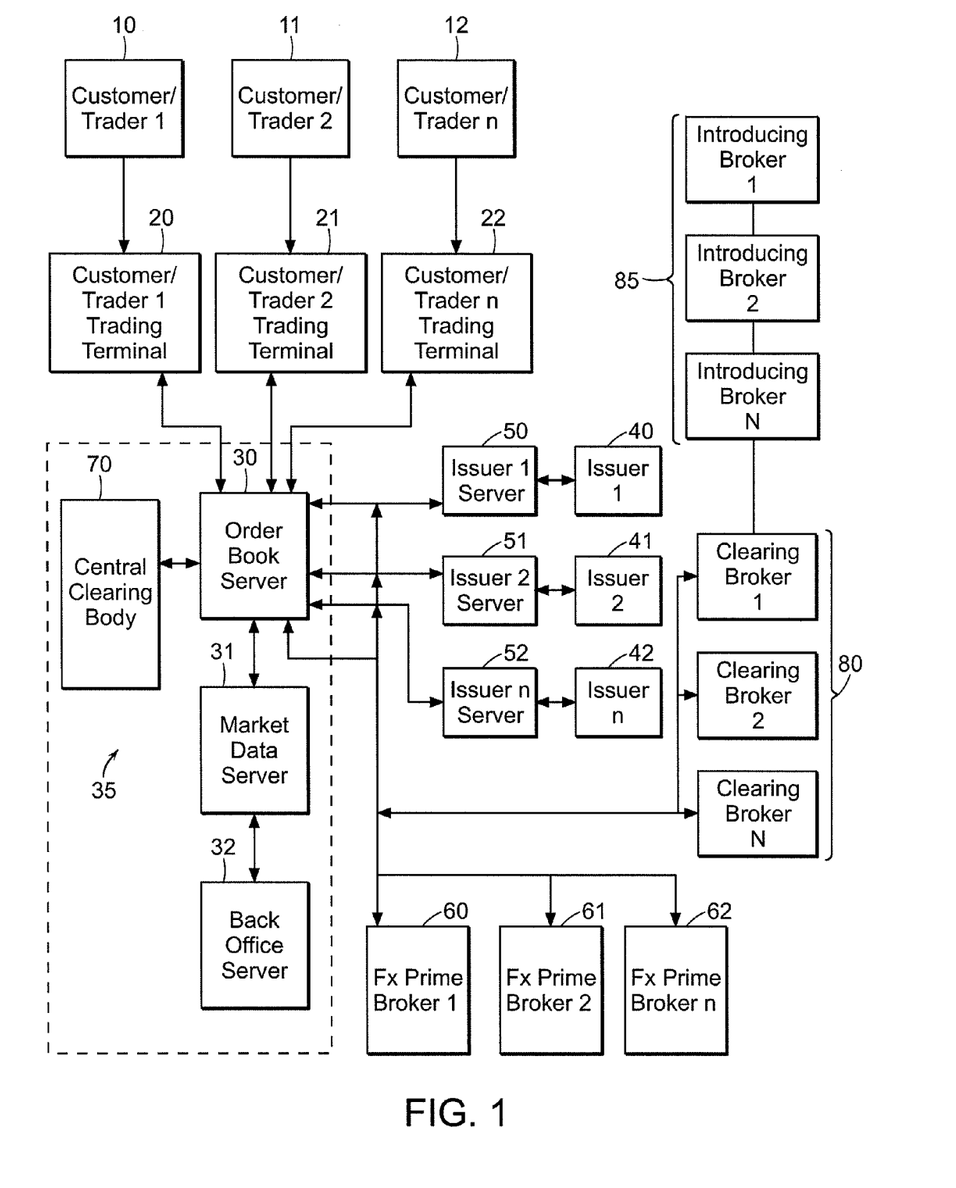
FIG. 1 is a diagram illustrating a computer-based system for offering and trading C-Notes™ convertible debt securities in primary and secondary markets and for redeeming and converting C-Notes™ into FX spot or forward transactions according to one embodiment.

FIG. 1 is a diagram illustrating a computer-based system for offering and trading C-Notes™ convertible debt obligations in primary and secondary markets and for redeeming and converting C-Notes™ into FX spot or forward transactions according to one embodiment. Multiple customer traders 10, 11, 12 (who are preferably a qualified institutional investor as discussed above) communicate with order book server 30 using their respective trading terminals 20, 21, 22. Order book server 30 is preferably operated by a legal entity whose assets and liabilities are segregated. The assets backing each C-Notes™ preferably are segregated from assets backing other C-Notes™. Trading terminals 20, 21, and 22 are programmed to be able to present the exemplary order entry screen depicted in FIG. 2. Trading terminals 20, 21, and 22 also can contain processing capabilities necessary to process and present the data depicted in FIG. 2 and to process calculations necessary to obtain data included in FIG. 2.

The order book server 30 is configured and programmed to communicate with multiple issuers 40, 41, and 42 via their respective servers 50, 51, and 52. Order book server 30 is configured and programmed to aggregate best bid and best offer information for the C-Notes™ convertible debt obligation and FX spot trades that can be executed according to particular embodiments of the invention. The aggregate best bid and offer information is communicated to trading terminals 20, 21, and 22 as well as any other trading terminals in communication with order book server 30. Order book server also contains a module that executes the process of matching trades of C-Notes™ in primary and secondary markets.

The order book server 30 communicates with a market data server 31 and back office server 32. Market data server 31 obtains information on interest rates used to calculate accrued interest as discussed below. Back office server 32 records trading data for C-Notes™ trades. As one of skill in the art will readily appreciate, order book server 30, market data server 31, and back office server 32 can be configured in many different ways. For example, the functionality of order book server 30, market data server 31, and back office server 32 can be combined into a single server 35 as depicted in FIG. 1, which performs the functions of order book server 30, market data server 31, and back office server 32.

Order book server 30 also communicates with the computer systems of one or more FX prime brokers 60, 61, 62 in real time. The real-time connections between order book server and FX prime brokers 60, 61, and 62 enable embodiments of the convertible debt obligation to be convertible into FX spot transactions in the currency pair that the debt obligation is created to track. Alternatively, a convertible debt obligations can be converted into FX forward transactions. The computer systems of FX prime brokers 60, 61, and 62 also are in communication issuers of C-Notes™, e.g., issuers 40, 41, and 42. FX prime brokers 60, 61, and 62 also include any counterparty that can guarantee a FX spot or forward transaction.

In particular embodiments, the order book server 30 can also communicate with one or more computer systems of clearing brokers 80, introducing brokers 85 and centralized clearing bodies 70 in real time. Clearing broker systems 80 perform the settlement of C-Notes™ transactions and communicate confirmations of settlement to the order book server 30. The introducing systems 85 communicate directly with the order book server 30 for executing orders for C-Notes™. The centralized clearing body 70 communicates with the order book server 30 for the purpose of clearing and settling transactions in C-Notes™. For example, a centralized clearing body 70 can guarantee payment and delivery of all aspects of primary, secondary and/or conversion of C-Notes™ transactions. The centralized clearing body 70 can be integrated into the back office server, providing an interface between counterparties. Accordingly, the centralized clearing body 70 can ensure that the counterparties make efficient markets and guarantee smooth markets in the event (i) one party fails to deliver or make payment on an obligation inherent in the structure of the instrument or (ii) failure of technology associated in the effecting of the market place of the invention.

A centralized computer-based clearing body 70 can include a centralized clearing corporation, a consortium of clearing corporations, a central bank, a consortium of central banks, a sovereign, a consortium of sovereigns, a sovereign sponsored corporation, a consortium of sovereign sponsored corporations, a supranational entity or a consortium of supranational entities. The functionality of one or more of the order book server 30, market data server 31, and back office server 32 can be separate from or integrated into the computerized systems of the centralized clearing body 70 itself. Where the system includes a centralized clearing body 70, the back office server 33 records and maintains all transactions of all outstanding C-Notes™ debt obligations, including conversions.

The above-described system as represented in FIG. 1 can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps as described below can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, trading terminals 20, 21, and 22 can be computers having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described system can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components.

The components of the system described above can be interconnected by any form or medium of digital data communications, e.g., a communications network. Examples of communications networks, also referred to as communications channels include a local area network ("LAN") and a wide area network ("WAN"), e.g., the Internet, and include both wired and wireless networks. Unless clearly indicated otherwise, communications networks can also include all or a portion of the PSTN, for example, a portion owned by a specific carrier.

Figure 2:
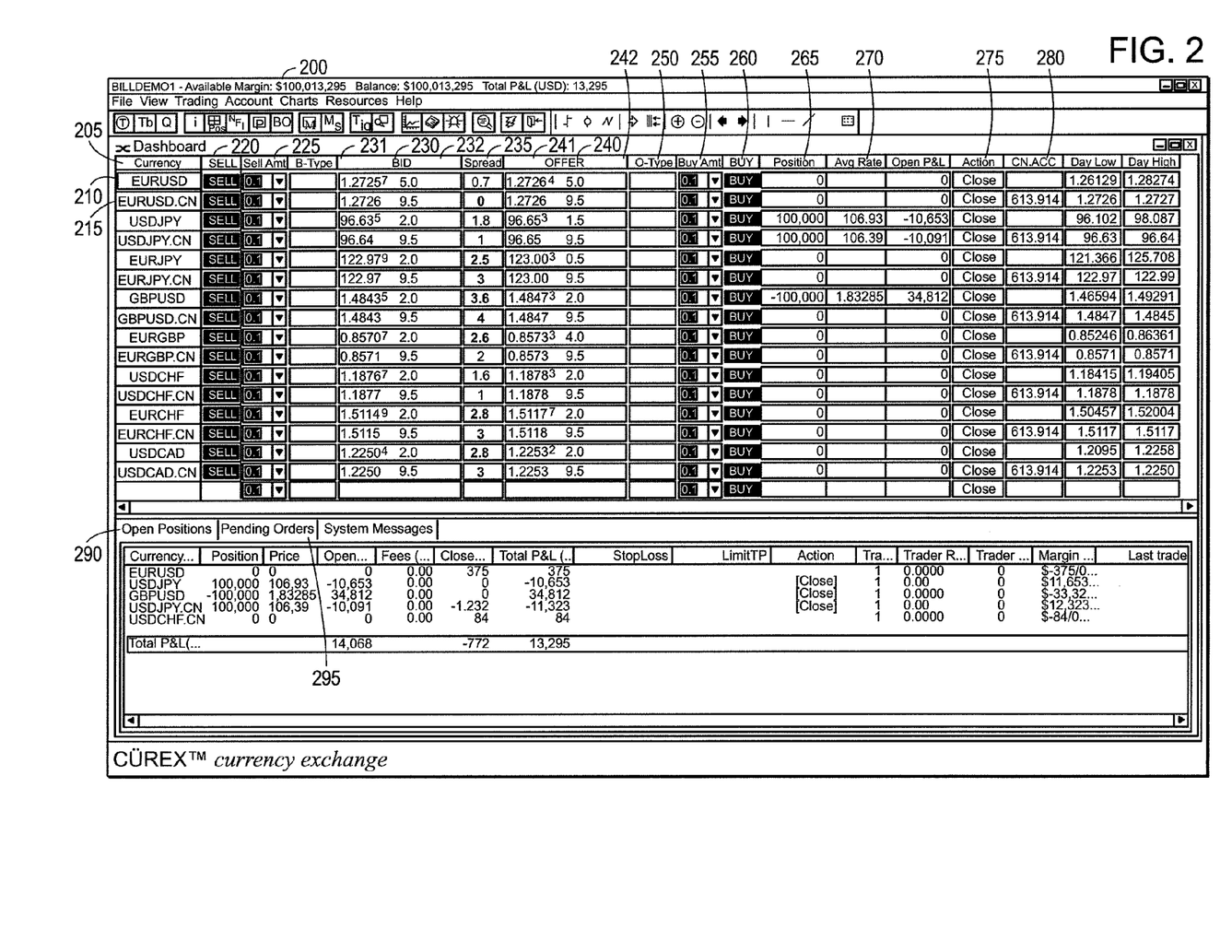
FIG. 2 is an exemplary representation of an order entry screen according to one embodiment.

The computing system of FIG. 1 as described above includes clients and servers. A client and server are generally remote from each other and typically interact through a communications network. The relationship of client and server arises by virtue of computer programs running on the respective computers and having a client-server relationship to each other FIG. 2 is an exemplary representation of an order entry screen according to one embodiment. Such screens can be customized with regard to type of data presented or the order in which the data is presented to suit an individual trader's needs. The order entry screen 200 would contain password protection and encrypt communications sent to and received at trading terminals on which the order entry screen 200 is generated.

Column 205 in order entry screen 200 lists a currency pair for a spot FX trade followed by its corresponding convertible debt obligation of one embodiment of the present invention. For example, row 210 presents information for a EUR/USD spot FX transaction while row 215 presents information for the convertible debt obligation of one embodiment of the present invention corresponding to the EUR/USD currency pair, the EURUSDCN, i.e., EUR/USD C-Notes™. Column 205 also lists other currency pair spot FX transactions followed by its corresponding convertible debt obligation.

Sell column 220 contains areas to enter sell transactions for the currency pair for a spot FX transaction or the debt obligation of one embodiment of the present invention listed in column 205 in the row corresponding to a particular entry area in sell column 220. The sell amount can be set using the drop down list in column 225. Column 230 contains the bid price 231 and bid quantity 232 corresponding to the currency spot FX transaction or convertible debt obligation in the corresponding rows of column 205. Column 240 contains the ask price 241 and ask quantity 242 corresponding to the currency spot FX transaction or convertible debt obligation in the corresponding rows of column 205. The buy amount can be set using the drop down list in column 255, and buy column 260 contains areas to enter buy transactions the currency pair for a spot FX transaction or the debt obligation of one embodiment of the present invention listed in column 205 in the row corresponding to a particular entry area in buy column 260. Preferably, areas for entry of buy and sell orders in columns 220 and 260 provide for single-click order entry.

The O-type column 250 identifies whether the debt obligation of one embodiment of the present invention listed in column 205 is being offered in the primary or secondary market. Column 265 provides information on what the trader's position is in the spot FX transactions and convertible debt obligations of one embodiment of the present invention listed in column 205. Column 270 corresponds to the average rate of a position. Column 280 contains entry areas to enable the trader to close out positions. The order entry screen of FIG. 2 also contains a column (not shown in FIG. 2) that contains areas for converting the convertible debt obligations of one embodiment of the present invention into FX spot of future transactions that correspond to particular C-Notes™.

Tab 290 provides the trader with another way of viewing open positions, and tab 295 enables the trader to view pending orders. As will be appreciated by persons of skill in the art, information related to trading the spot and forward FX transactions and C-Notes™ of one embodiment of the present invention other than what is depicted in FIG. 2 can be presented as well.

Figure 3:
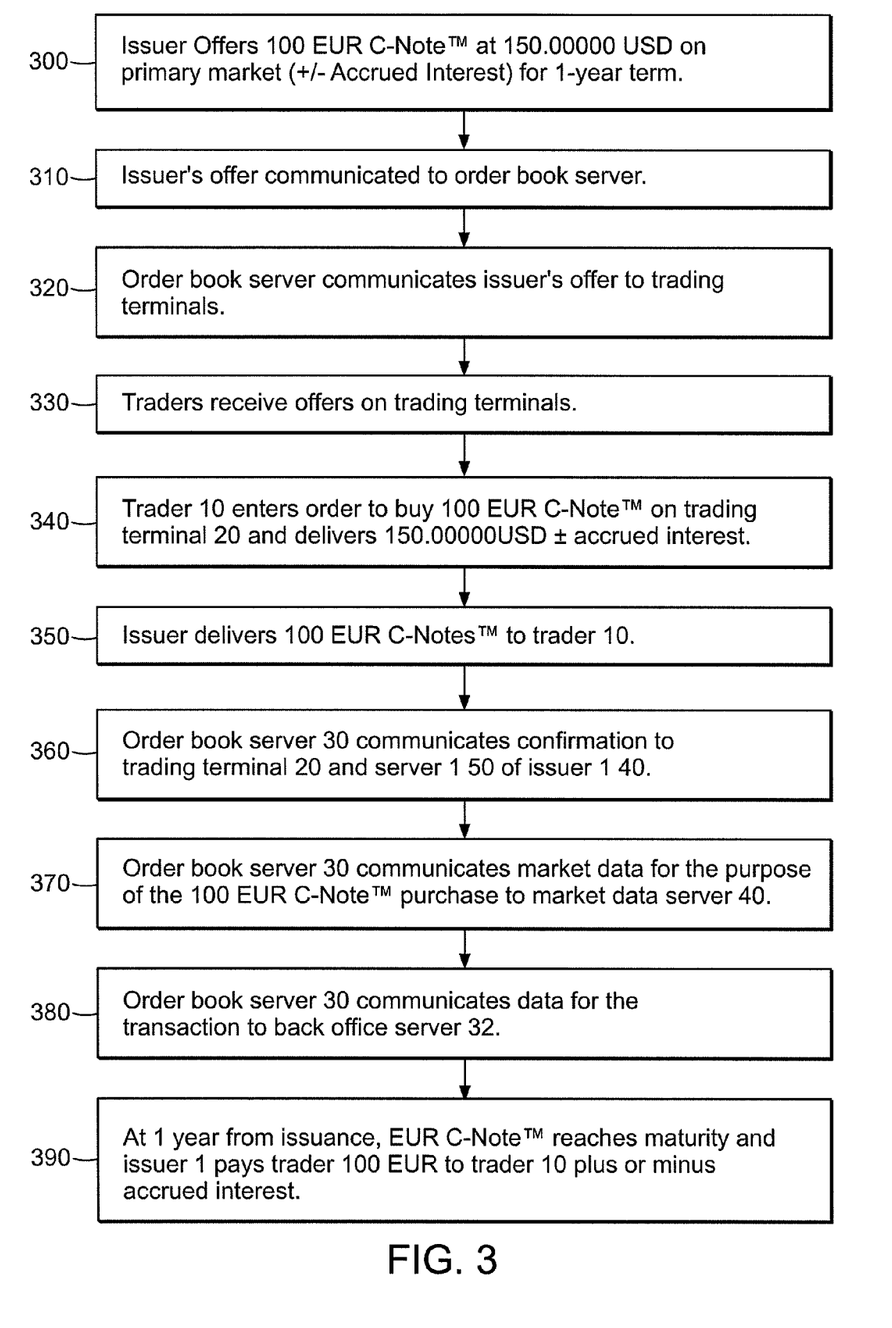
FIG. 3 is a flow diagram illustrating an exemplary method for conducting a primary market transaction in and redemption of a C-Notes™ convertible debt obligation according to one embodiment.

FIG. 3 is a flow diagram illustrating an exemplary method for conducting a primary market transaction in and redemption of a C-Notes™ convertible debt obligation according to one embodiment. In step 300 of FIG. 3, an issuer offers a 100 Euro C-Notes™ at a price of 150.00000 plus or minus accrued interest, with a one year term. C-Notes™ are preferably priced to the nearest $1/100,000^{th}$ of a unit (the nearest "tini") as opposed to the nearest $1/10,000^{th}$ of a unit (the nearest "pip"). In such embodiments, an improvement can be realized over existing currency ETFs currently trading on regulated stock exchanges which, due to the existing pricing mechanism on stock exchanges that limits minimum price intervals to one penny, has limited existing currency ETFs to price to an equivalent of 10,000th. For the purpose of price transparency and fungibility to spot FX market, it is desirable that a security priced to 100,000th be made available to the marketplace. The C-Notes™ debt obligation accomplishes this due to its unique structure. The term of the C-Notes™ can be for periods longer or shorter than one year. The term of the C-Notes™ obligation determines when the C-Notes™ reaches maturity and is redeemed.

C-Notes™ can also be created when trader 10, using trading terminal 20, makes a deposit of sufficient funds to enable an issuer (e.g., issuer 1 40) to create a tranche of C-Notes™. The deposit of funds is communicated to the issuer via the order book server, but can be communicated directly to the issuer.

Upon the acceptance and confirmation of such a notification, a settlement date would be set when funds would be due from the trader 10 and when the C-Notes™ would be delivered by the issuer. The settlement period (corresponding to the settlement date) for a C-Notes™ currency pair is preferably equal to the settlement period for the corresponding currency pair in the interbank foreign exchange market. For example, a EUR/USD currency pair typically has a settlement period of two days in the interbank spot FX market. The EUR/USD C-Notes™ can also have the same settlement period in a primary or secondary market.

In order to offer or issue C-Notes™, the base currency and reference must be determined. For EUR\USD C-Notes™, the EUR is the base currency and the USD is the reference currency. A market price must also be set for the C-Notes™. The C-Notes™ is designed so that its market price is expected to track 100 times the interbank FX spot exchange rate as quoted in accordance with standard interbank conventions.

In step 310, the offer of an issuer (e.g., issuer 1 40) is communicated to order book server 30 via the issuer's server (e.g., issuer 1 server 50). In step 320, order book server 30 communicates the issuer's offer to the trading terminal 20 of trader 10 (and the terminals of any other traders who have trading terminals in communication with order book server 30). In step 330, traders 10, 11, and 12 receive offers on trading terminals 20, 21, and 22. In step 340, trader 10 enters an order to buy the 100 Euro C-Notes™ on trading terminal 20 and delivers 150.00000 USD±accrued interest or a commitment to pay such amount to the issuer server for example, via the order book server. In step 350, the issuer delivers 100 Euro C-Notes™. In step 360, the order book server 30 communicates confirmation of the 100 EUR C-Notes™ purchase to trading terminal 20 of trader 10 and to the server 1 50 of issuer 1 40. In step 370, the order book server 30 communicates market data for the transaction to the market data server 31. In step 380, order book server communicates data concerning order executions and confirmations to back office server 32. In step 390, when the C-Notes™ reaches maturity at the end of the one year term of the C-Notes™ and is redeemed, and issuer 1 50 pays 100 Euro to trader 10 plus or minus accrued interest.

Order book server 30 is configured and programmed to perform calculations of accrued interest. Alternatively, market data server 31, office server 32, and/or trading terminals (e.g., trading terminal 20) are configured and programmed to perform accrued interest calculations. Issuers must also keep track of accrued interest through communications between the order book server 30 and issuer servers or issuers can make their own accrued interest calculations at their own servers.

Accrued interest is calculated at issuance, redemption, and conversion of C-Notes™ C-Notes™ that are denominated in USD can calculate accrued interest by adding the effective Fed Funds Overnight rate (or similar overnight money market or repo market rate to the difference between the effective Overnight Rate central bank rate or repo market rate of the base currency and the effective Overnight Rate central bank rate or repo market rate of the reference currency. Accrued interest can be calculated daily and paid preferably monthly (or some other period). Accrued interest can be calculated for other periods as well. For example, accrued interest can be calculated in real time based on a current repo market rate allowing for intra-day interest calculation and payments that can be paid daily or every two day matching an interbank settlement system. A repo, otherwise referred to as repurchase agreements, RP or a sale and repurchase agreement has a borrower (seller/cash receiver) sell securities for cash to a lender (buyer/cash provider) and agree to repurchase those securities at a later date for more cash. The repo rate is the difference between borrowed and paid back cash expressed as a percentage.

Accrued interest can be negative, even at issuance. However, investors are not disadvantaged by negative accrued interest because any negative accrued interest is offset by payment to the investor at purchase and reflects the true cost of carry during the holding period for which the investor has invested in C-Notes™. At maturity, any negative carry can be deducted from principal repayment to investors.

The order book server 30 can receive data from C-Notes issuers' servers via Application Programming Interfaces (API) with respect to calculation of accrued interest calculations. These calculations can approximate the C-Notes Issuer's calculation of Effective Fed Funds Overnight rate plus or minus Carry. This data can be stored in the order book server 30 (and also can be stored in the market data server 31 or the back office server 32) and fed into various algorithms to calculate price and contract values in the order management, display and execution software programs that can reside on the server.

Figure 4:
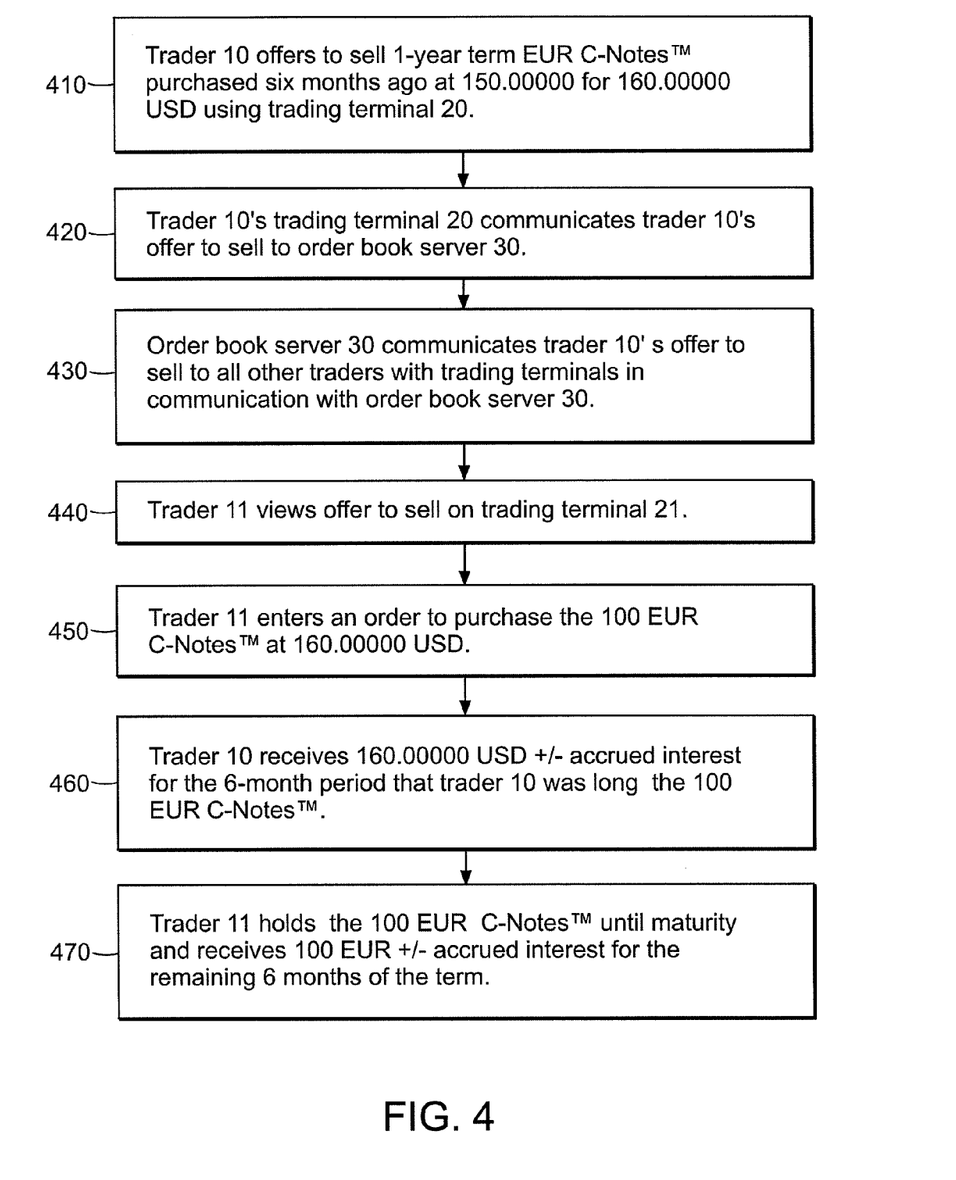
FIG. 4 is a flow diagram illustrating an exemplary method for conducting a secondary market transaction for purchasing and redeeming a C-Notes™ debt obligation according to one embodiment.

FIG. 4 is a flow diagram illustrating an exemplary method for conducting a secondary market transaction for purchasing and redeeming a C-Notes™ debt obligation according to one embodiment. For this example, assume Trader 10 has purchased 100 EUR C-Notes™ at 150.00000 with a term of one year in a primary market transaction, which investor 10 has held for six months. In step 410, trader 10 enters an offer to sell those 100 EUR C-Notes™ using trader terminal 20 at a price of 160.00000 USD. In step 420, the offer to sell of trader 10 is communicated to order book server 30. In step 430, order book server 30 communicates the offer to sell of trader 10 to all other traders who have trading terminals in communication with order book server 30. In step 440, trader 11 views the offer to sell 100 EUR C-Notes™ of trader 10 on trading terminal 21. In step 450, trader 11 enters an offer to purchase the 100 Euro C-Notes™ of trader 10 at 160.00000 USD. In step 460, trader 10 receives 160.00000 USD±accrued interest for the 6-month period that trader 10 held a long position in the 100 EUR C-Notes™. In step 470, trader 11 holds the 100 Euro C-Notes™ until maturity and receives 100 EUR±accrued interest for the remaining 6 months of the term of the C-Notes™.

Figure 5:
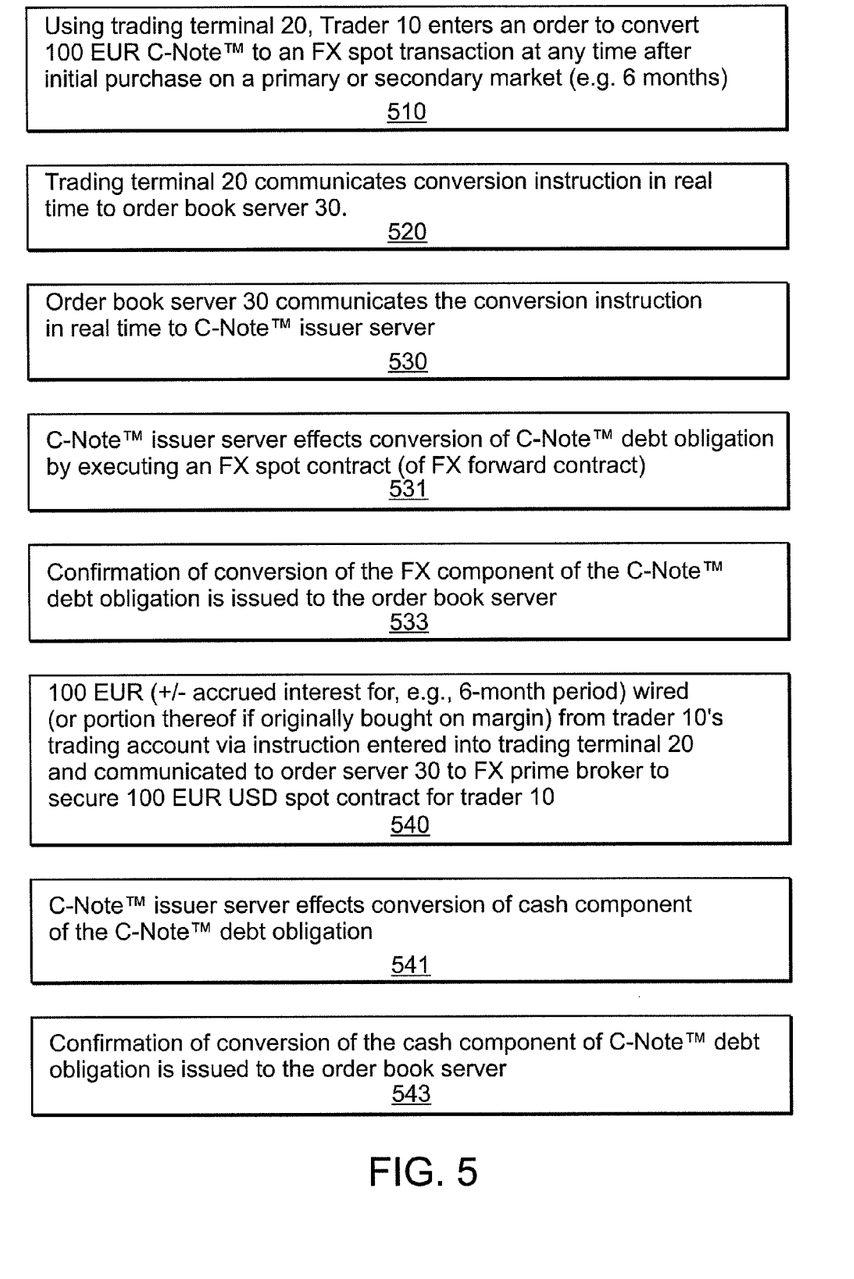
FIG. 5 is a flow diagram showing how the convertible debt obligations of the present invention are converted into FX spot or forward transactions using one embodiment of the present invention.

FIG. 5 shows how one embodiment of the present invention is used to allow traders to take advantage of the novel feature of the C-Notes™ of converting the C-Notes™ into cash plus a spot foreign exchange contract. Instead of offering to sell the 100 Euro C-Notes™, trader 10 decides to convert them into an FX spot transaction.

In step 510, trader 10 uses trading terminal 20 to enter an order to convert his 100 EUR C-Notes™ to an FX spot transaction on a date at any time after initial purchase on the primary or secondary market (e.g. 6 months). In step 520, a trading terminal 20 communicates the conversion instruction in real time to order book server 30.

In step 530, order book server 30 communicates the conversion instruction in real time to a C-Notes™ issuer server At step 531, the issue server effects conversion of the FX component of the C-Notes™ convertible debt obligation. For example, the issuer server can cause the issuer, acting as counterparty to the trader's FX prime broker, to effect the conversion of the C-Notes™ debt obligation by executing an FX spot contract (or FX forward contract). For example, such conversion can be initiated by the issuer server sending an electronic order message to an in-house trading desk, Electronic Communication Network (ECN), or an order book matching server to credit the trader's FX prime broker with the corresponding spot FX contract. In response, the issuer or the FX prime broker of the C-Notes™ issuer enters into a short position in the spot FX contract while the trader or the trader's FX prime broker enters into a long position with the corresponding spot FX contract. Such transactions can be executed through electronic messaging with the order book server 31.

At step 533, confirmation of conversion of the FX component of the C-Notes™ debt obligation is issued to the order book server. For example, in one embodiment, the issuer server and the FX prime broker send confirmation messages regarding the FX conversion to the order book server 31. The order book server, in turn, can record details of this transaction to the back office server and send a confirmation message to the trader. Details of such transactions are recorded in the back office server for the purpose of recordkeeping and order confirmation and reconciliation. In another embodiment, where a centralized clearing body 70 is involved in the transaction, the order book server 31 sends the confirmation message to the centralized clearing body 70, which, in turn, routes confirmation of the conversion to the trader and back to the issuer server. Alternatively, the centralized clearing body 70 can send a confirmation message back to the order book server 31 which, in turn, reports all confirmations back to the trader.

In step 540, 100 EUR plus or minus accrued interest is wired (or portion thereof if the C-Notes™ was originally bought on margin) from trader 10's trading account via instruction communicated to trading terminal 20 and communicated via order book server 30 to FX prime broker 60 to secure 100 EUR\USD spot contract for trader 10.

At step 541, the issuer server effects conversion of the cash component of the C-Notes™ debt obligation. For example, 100 EUR (or an equivalent in USD or portion thereof if originally purchased and booked at the issuer server and in back office server on margin according to a custom agreement between the trader and the issuer) is transferred to the trader's account at a clearing broker from the C-Notes™ issuer. If the trader's account is at an introducing broker, the clearing broker can, in turn, communicate the change in status of the trader's account to the introducing broker.

At step 543, confirmation of conversion of the cash component of the C-Notes™ debt obligation is issued to the order book server. For example, in one embodiment, the issuer server confirms that the cash was sent to the clearing broker and the clearing broker sends confirmation of receipt of the cash to the order book server 31. The order book server, in turn, can record details of this transaction to the back office server and send a confirmation message to the trader. In another embodiment, where a centralized clearing body 70 is involved in the transaction, the order book server 31 sends the confirmation message to the centralized clearing body 70, which, in turn, routes confirmation of the cash conversion to the trader and the issuer server. Alternatively, the centralized clearing body 70 can send a confirmation message back to the order book server 31 which, in turn, reports all confirmation back to the trader.

Any of the aforementioned embodiments can include the following feature. The C-Notes™ debt obligation can be transacted in a short or long net position by posting sufficient capital (or good faith for support of sufficient extension of credit) in traders accounts at C-Notes™ issuer server or with centralized clearing body. These long or short transactions can be accompanied by an agreement on the part of the C-Notes™ Issuer, other trader or a centralized clearing body connected to the electronic network to re-purchase from the trader or re-sell such instrument to the trader at set price and at set date in the future, effectively creating a repo and reverse repurchase market. Each leg of such transaction can be transacted with a centralized clearing body acting as counterparty to each leg of the transactions. In other words, an electronic marketplace is provided enabling centralized clearing of multi-currency debt obligation purchase and repurchase agreements in coordination with primary and secondary market transactions.

In summary, embodiments of the present invention advantageously allow a trader to maintain a currency position in C-Notes™ without having to engage in rollover transactions, while providing the trader with the flexibility to nearly instantaneously convert the C-Notes™ into FX spot or forward transactions.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of the appended claims, they are intended to be encompassed therein.

What is claimed is:

1. A computer-implemented method for offering a debt obligation comprising:

pricing the debt obligation in a currency pair of a base currency in relation to the value of a reference currency, the debt obligation having a face value, term of maturity, and being convertible into a foreign exchange contract with a currency pair of the base currency and the reference currency of the debt obligation at any time after issuance and before maturity of the debt obligation;

communicating an offer to sell the debt obligation from an order book server to one or more trader computer terminals;

receiving an offer to purchase the debt obligation at the order book server from one of the one or more trader computer terminals;

receiving information at the order book server confirming a deposit of funds from the one or more trader computer terminals to purchase the debt obligation; receiving at the order book server information of one or more foreign exchange transactions entered into to issue the debt obligation;

communicating to the one or more trading computer terminals that purchased the debt obligation a position in the debt obligation; and calculating accrued interest on the debt obligation at the order book server.

2. The method of claim 1, wherein the accrued interest is calculated by adding one of an effective Fed Funds Overnight rate, overnight money market rate, or repo market rate for the base currency to the difference between the effective Fed Funds Overnight Rate, central bank rate, or repo market rate of the base currency and the effective Fed Funds Overnight Rate, central bank rate or repo market rate of the reference currency.

3. The method of claim 1, wherein the accrued interest is calculated daily.

4. The method of claim 1, wherein the accrued interest is calculated in real time based on a current repo market rate allowing for intra-day interest calculation and interest payments paid daily or every two days according to an interbank settlement system.

5. The method of claim 2, wherein the accrued interest is calculated daily.

6. The method of claim 1, wherein the accrued interest is negative.

7. The method of claim 1, wherein the communication of the offer to sell the debt obligation is made in response to a request to an issuer to offer a tranche of the debt obligation.

8. The method of claim 2, wherein the communication of the offer to sell the debt obligation is made in response to a request to an issuer to offer a tranche of the debt obligation.

9. A system for trading a debt obligation, the system comprising:
an order book server configured to:
price the debt obligation in a base currency in relation to a reference currency to have a face value and a term of maturity;
communicate an offer to sell the debt obligation from the order book server to one or more trader computer terminals;
receive communications of an offer buy the debt obligation at the order book server from the one or more trader computer terminals;
communicate the offer to sell the debt obligation to the one or more trader computer terminals; receive an offer to purchase the debt obligation from one of the one or more trader computer terminals;
receive a deposit of funds at the order book server from the one or more trader computer terminals to purchase the debt obligation;
receive at the order book server information of one or more foreign exchange contracts entered into to issue the debt obligation;
communicate to one or more trader computer terminals that purchased the debt obligation a position in the debt obligation;
calculate accrued interest on the debt obligation; and
communicate with one or more trading computer terminals, one or more issuer servers, and one or more foreign exchange prime brokers or other counterparties to electronically execute a foreign exchange transaction with one of the one or more of the foreign exchange brokers or the other counterparties to convert the debt obligation into a foreign exchange contract at any time after issuance and before maturity.

10. The system of claim 9, wherein the order book server is configured further to receive and execute requests to convert the debt obligation to a spot or forward foreign exchange contract.

11. The system of claim 9, wherein the order book server is configured further to redeem the debt obligation at maturity for the face value of the debt obligation plus or minus the accrued interest on the debt.

12. The system of claim 9, wherein the order book server is configured further to calculate the accrued interest daily.

13. The system of claim 9, wherein the order book server is configured further to calculate the accrued interest in real time based on a current repo market rate allowing for intra-day interest calculation and interest payments paid daily or every two days according to an interbank settlement system.

14. The system of claim 9, wherein the order book server is configured to communicate with a centralized clearing body that clears and settles transactions in the debt obligations.

15. The system of claim 14 wherein the centralized clearing body includes a centralized clearing corporation, a consortium of clearing corporations, a central bank, a consortium of central banks, a sovereign, a consortium of sovereigns, a sovereign sponsored corporation, a consortium of sovereign sponsored corporations, a supranational entity or a consortium of supranational entities.

16. The system of claim 14 wherein the centralized clearing body comprises the order book server.

17. The method of claim 1, wherein the debt obligation is created by entering into a forward foreign exchange contract.

18. The system of claim 9, wherein the order book server is configured to create the debt obligation by directly or indirectly executing or causing the execution of a forward foreign exchange contract.

19. The system of claim 9, wherein the order book server is further configured to receive and execute requests to convert the debt obligation to a future foreign exchange contract.

20. The system of claim 9, wherein the order book server is configured to communicate in real time with one or more prime brokers.

21. The system of claim 9, wherein the order book server is configured to communicate in real time with more than two prime brokers.

* * * * *

UNITED STATES PATENT AND TRADEMARK OFFICE
CERTIFICATE OF CORRECTION

| | | |
|---|---|---|
| PATENT NO. | : 8,429,057 B1 | Page 1 of 1 |
| APPLICATION NO. | : 12/274319 | |
| DATED | : April 23, 2013 | |
| INVENTOR(S) | : William J P Dale | |

It is certified that error appears in the above-identified patent and that said Letters Patent is hereby corrected as shown below:

In the Claims

Claim 11, Column 18, Line 4, after the word "debt" include the word --obligation--

Signed and Sealed this
First Day of October, 2013

Teresa Stanek Rea
*Deputy Director of the United States Patent and Trademark Office*